Feb. 16, 1937.  L. S. SORENSEN  2,070,869
OIL WELL DEVICE
Filed Aug. 27, 1934  2 Sheets-Sheet 2
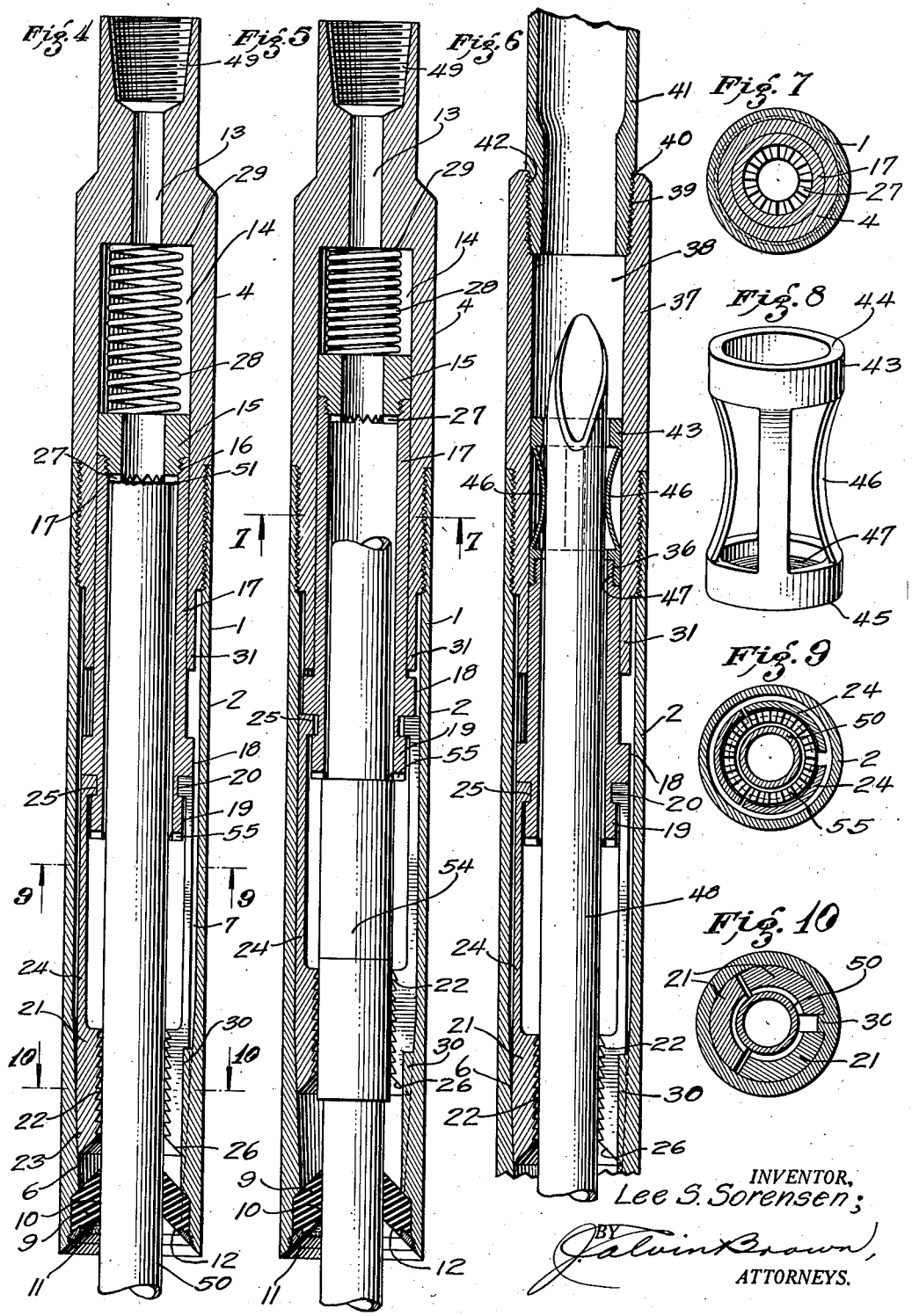
INVENTOR,
Lee S. Sorensen;
BY Calvin Brown
ATTORNEYS.

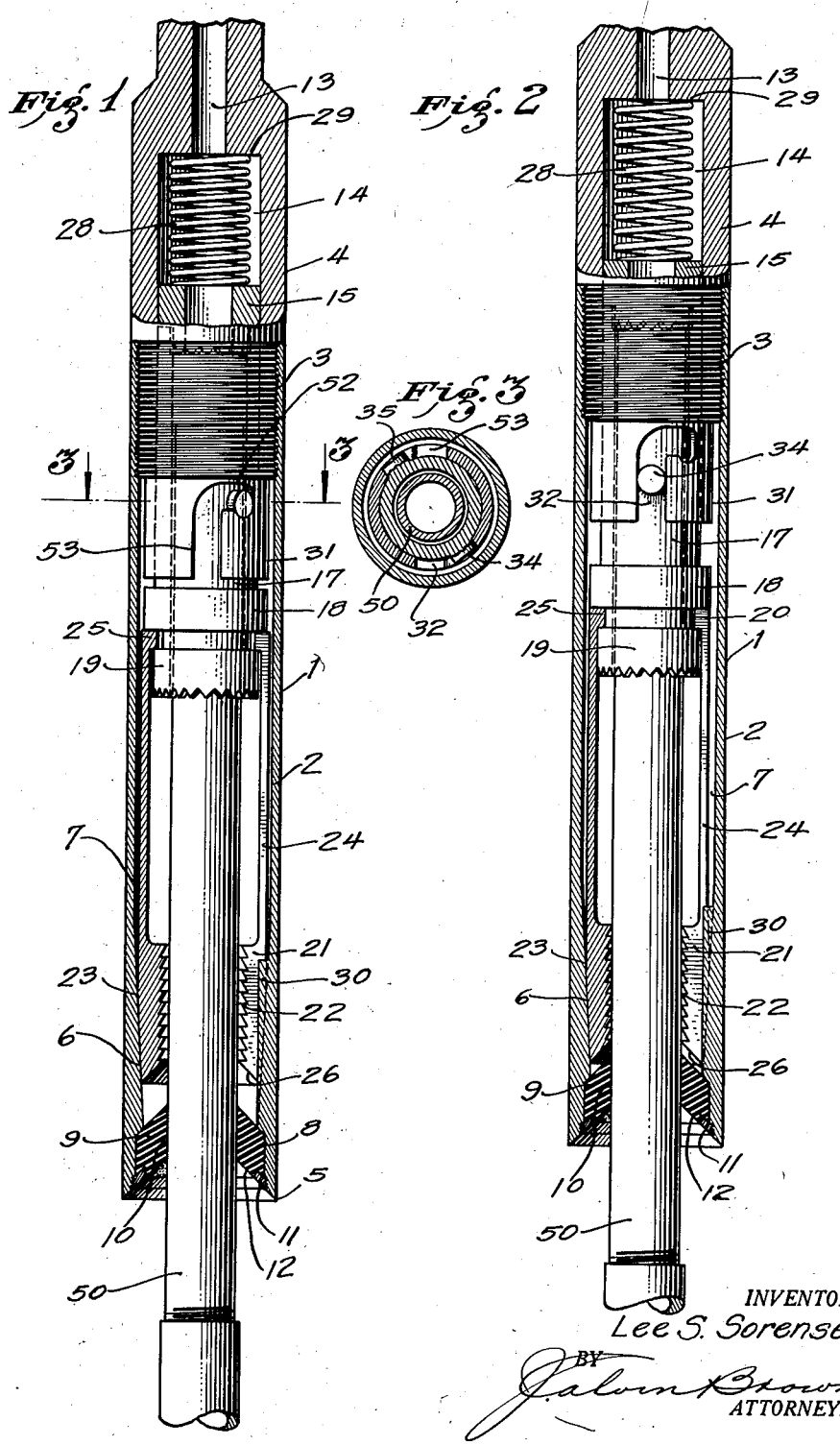

Patented Feb. 16, 1937

2,070,869

UNITED STATES PATENT OFFICE 2,070,869

OIL WELL DEVICE

Lee S. Sorensen, Long Beach, Calif.

Application August 27, 1934, Serial No. 741,697

4 Claims. (Cl. 294—102)

This invention relates to oil well devices, and particularly to that class of oil well device known broadly as a fishing tool. Specifically, the invention contemplates a combination release overshot and rotary socket.

Various devices are now on the market which may engage a "fish" or disengage the "fish" at the will of an operator. However, the devices now known to the inventor are subject to breakage, do not always grab or release, are not positive in action, and generally inefficient when subjected to constant use.

The present invention has for an object the provision of a device adapted to overcome the various deficiencies above enumerated.

An object of the present invention is to provide a fishing tool adapted to receive a long length of the "fish" to the end that considerable area of the "fish" may be contacted by the fishing tool.

A further object of the invention is the provision of a fishing tool which may engage a "fish" and permit, by the rotary table or otherwise, the "fish" to be unscrewed at a coupling so that lengths of the "fish" may be withdrawn from the well hole.

This last object is particularly applicable to the securing of drill pipe, which has either twisted off or become frozen from various causes within the well hole.

The present invention is so designed and constructed that when a hold is taken upon the "fish" if for any reason the "fish" cannot be moved, the tool may be readily released from the "fish".

Another object of the invention is the provision of a fishing tool so arranged and constructed as to accommodate within the confines thereof, not only a portion of drill pipe but likewise collar members secured to said drill pipe.

A further object is the provision of a fishing tool in which the working parts are not likely to be damaged and which working parts are so arranged and constructed as to positively contact with the "fish".

The invention contemplates a device which is inexpensive of manufacture, fool-proof in operation, with parts so arranged and constructed as to not be likely to be broken, and which is generally superior to devices now known to the inventor.

With the above mentioned and other objects in view, the invention consists in the novel and useful provision, formation, construction, association, and interrelation of parts, members, and features, all as detailed in certain embodiments in the accompanying drawings, described generally, and more particularly pointed out in the claims.

In the drawings:

Figure 1 is a fragmentary longitudinal sectional view of one form of the invention, with a "fish" in part received therein, Figure 2 is a longitudinal sectional view similar to Figure 1, certain parts being in a changed position, Figure 3 is a sectional view on the line 3—3 of Figure 1, Figure 4 is a longitudinal sectional view of the invention, the view being revolved 90° from the showing of Figure 1, Figure 5 is a longitudinal sectional view of the device, a "fish" member provided with a coupling being received within said device, Figure 6 is a longitudinal sectional view of a modified form of the invention, Figure 7 is a sectional view on the line 7—7 of Figure 5, Figure 8 is a perspective view of an element of the invention used in that embodiment shown in Figure 6, Figure 9 is a sectional view on the line 9—9 of Figure 4, and, Figure 10 is a sectional view on the line 10—10 of Figure 4.

Having particular reference to that form of the invention shown in Figures 1 to 5, inclusive, the improved combination release overshot and rotary socket is designated as an entirety by the numeral 1, wherein 2 is the body which is substantially tubular in form, being internally screw-threaded at one end 3 for threaded engagement with a sub 4. The body 2 varies in thickness inward from the end 5, thus providing what may be termed a tapered inner wall surface 6. The chamber normally included within the tubular body is here defined as the bowl 7.

A portion of the body adjacent the end 5 is annularly grooved at 8 to receive a packing 9. This packing is substantially conical in form and provided with a central opening 10. The said packing is held in position within the annular groove 8 through the medium of an annular nut 11 screw-threaded to the body. The packing nut and a portion of the body forms what may be termed a bell mouth 12. This construction allows the ready entrance of any "fish" within the bowl 7.

The sub 4 is provided with an axial bore 13, forming a water passage, and with a bore 14, of greater diameter and likewise in communication with the bore 13. Movable within the bore 14 is a nut 15 reduced in external diameter and threaded at 16, to which threads is secured an elongated tubular member 17, constituting a slip carrier. Said tubular member is substantially uniform as respects the diameter of the bore. The diameter of the external surface, however, is enlarged at 18 to provide an annular flange, and said tubular member 17 is reduced in diameter at 19. Between the portions 18 and 19 is an annular groove 20. Within the bowl 7 are slips 21. These slips are substantially wedge-shaped segments provided with internal teeth 22. The external surface 23 of each slip is adapted to slide upon the inclined surface 6 of the body 2. A sufficient number of slips is used to provide a circular formation. Each slip is provided with an arm 24, the arm terminating in an inwardly directed part 25, which part is received within the groove 20. In this manner, the said slips are held suspended by the slip carrier 17. The mouth end 26 for all the said slips is inclined or beveled to permit ready entrance of the "fish", as hereinafter described, within the confines of the slips.

The member 15 constitutes what may be termed a friction nut, in that the said nut is provided with an annular series of facial teeth 27 in part received within the confines of the slip carrier 17. An enlarged coil spring 28 is interposed between a wall 29 of the top sub and the top surface of the friction nut 15. This coil spring normally urges the nut 15 of the slip carrier and the slips toward the mouth end of the bowl 1.

It is essential in actual operation of the device that the slips be prevented from rotating within the bowl and to this end, a key 30 is interposed between two of the slips. This key may constitute a member independent of the body 2, or it may be integrally formed within the body, as shown in the drawings (see Figure 10).

Referring back to Figures 1 to 3, inclusive, it will be observed that the top sub is provided with an annular skirting 31 beyond the threaded area of the said sub. This skirting is provided with two diametrically disposed bayonet slots 32 and 33. The slip carrier is provided with two diametrically disposed studs 34 and 35, which studs are adapted for reception within the confines of the bayonet slots.

Referring to the form of the invention shown in Figures 6 and 8, I have provided as before a slip body 2 having the beveled inner surface 6, the same type of key 30 and the slips 21 having teeth 22, extended arms 24, and inwardly directed end portions 25 secured to the arms. The slip carrier, however, differs slightly in construction, in that the tubular portion 17 is provided with a portion of reduced diameter 36 which is screw-threaded. The remaining portions of the slip carrier are the same and like reference characters will be applied thereto. The top sub 37, as before, is in screw-threaded engagement with the body 2 and the bore 38 in said sub is of uniform diameter. The sub is provided with an internally tapered screw-threaded portion 39 inwardly from its outermost end 40. It is intended that drill pipe, such as shown at 41, carrying screw-threads 42, have screw-threaded engagement with the threads 39 of the sub.

A leaf spring cage, designated generally as 43, is adapted to be confined within the part 37 of the top sub and secured to the slip carrier. In this respect, the said cage shown in Figure 8, includes top and bottom annular members 44 and 45, and a plurality of equidistantly spaced, bowed leaf springs 46 interconnecting the members 43 and 45. The annular member 45 is internally threaded at 47 for engagement with the threads 36.

As before, the top sub member 37 is provided with a skirting 31, which skirting is in turn formed with a pair of diametrically disposed bayonet slots 32 and 33 and within the slots are received studs 34 and 35 secured to the slip carrier 17.

The operation, uses and advantages of the invention shown in Figures 1 to 5, inclusive, are as follows:

The fishing tool is secured in the usual manner to drill pipe, and for this purpose, the sub 4 is provided with a threaded box 49 to receive a pin. When the device is lowered within the well hole, the flared mouth of the device will direct the "fish" 50 inward of the bowl (see Figure 4). The "fish" in this instance constitutes a portion of drill pipe which may have twisted off, become frozen, or for various reasons, is within the well hole and must be removed therefrom. This "fish" will pass within the confines of the slips and likewise within the confines of the slip carrier 17 until the upper end thereof contacts with the annular teeth 27 of the friction nut 15, as shown at 51. I have, of course, assumed that the fishing tool has been lowered within the well hole, the "fish" being stationary and of a size to permit the said "fish" to be received within the confines of the slip carrier. Further lowering of the fishing tool will cause further entrance of the "fish" within the bowl and compress the spring 28. As the friction nut is pushed upwardly to compress the spring, the slip carrier, together with the slips 21, likewise moves upwardly. In this connection see Figure 1 which shows the spring 28 compressed. It is not absolutely essential that the spring be compressed, as shown in Figure 1, but it is difficult for a well operator at the surface of a well to at all times tell the amount of compression of the spring, but as a rule, the fishing tool is lowered as far as it will go to assure that the "fish" has been contacted. After the well operator is assured that the "fish" has been engaged, further lowering of the drill pipe is stopped and the drill pipe is then rotated to the right, or counter-clockwise, viewing Figure 1. When this rotation occurs, the studs 34 and 35 will move from the transverse slotted portion 52 into the vertical slotted portion 53 of both bayonet slots, or into the position shown in Figure 2. When this occurs, slight upward movement of the drill pipe to carry with it the fishing tool, will allow the spring 28 to expand to, say, the position shown in either Figure 2 or Figure 4, and urge the slips into engagement with the "fish", as shown in said figure. Further movement of the fishing tool upwardly causes the slips to bite into the "fish" for the reason that the slips slide upon the tapered surface 23 of the bowl. Assuming that it is impossible to loosen the fish, the well operator may then turn the rotary table to cause rotative action of the fishing tool and inasmuch as the slips are prevented from rotating within the bowl, due to the presence of the key 30, rotation of the fishing tool and of its component parts, will be effected with the result that the "fish", if it happens to be the drill pipe shown, will be unscrewed from a further length of the "fish". As a rule, different lengths of drill pipe are interconnected by means of tool joints, and thus one of the joint members would be separated from the other joint member. However, if movement of the "fish" is still impossible of accomplishment, the drill pipe may be lowered to again cause compression of the spring 28 in the fishing tool by the said slip carrier and friction nut moving upwardly, whereupon the studs 34 and 35 will move upwardly within the vertical portions 53 of the bayonet slots and a turning of the drill pipe will rotate the fishing tool and permit the studs to be received in the transverse slots 52. Accordingly, the slips are released from the "fish" and the tool may be lifted, leaving the "fish" within the well hole.

In Figure 5, the "fish" constituting drill pipe, has a coupling 54 interconnecting lengths thereof. This coupling readily enters the fishing tool but the diameter of the coupling is greater than the internal diameter of the slip carrier 17, with the result that an edge portion of said coupling will engage the annular set of teeth 55 formed on the portion 19 of the slip carrier. As the fishing tool is lowered over the "fish", the spring 28 will be compressed as shown, and the frictional engagement existing between the coupling and the teeth 55 is such that the body 2 and the sub may be rotated, the slip carrier 17, and the friction nut 15 being held stationary. The slips, however, do not engage the "fish" at this time, with the result that the slips will move with the turning movement of the body and sub due to the keyed relationship that exists between the slips and the body, the inwardly directed portions 25 of the slip arms moving within the slot 20. Thus, the studs 34 and 35 may be released from the transverse portions of the bayonet slots into the vertical slotted portions. When this occurs, upward pull on the drill pipe to carry with it the fishing tool, will permit the slips to forcibly engage the coupling 54. If for any reason it is desired to release the "fish", the procedure is as follows: The studs 34 and 35 are at all times within the bayonet slots. Secondly, downward movement of the drill pipe to lower the fishing tool will move the slip carrier and its associated nut upwardly to position the said studs adjacent the transverse slotted portions of the bayonet slots, whereupon rotation in a clockwise direction, viewing Figures 1 and 2, will again serve to release the slips from the "fish".

The form of the invention shown in Figures 6 and 8 operates as follows:

The "fish" 48 may pass entirely through a fishing tool and be received within the drill pipe, to the end that a long length of the drill pipe or "fish" may be engaged by the fishing tool. Assuming that the "fish" enters as shown in Figure 6, the surface of the "fish" will be frictionally engaged by the leaf springs 46. The amount of upward movement or travel of the member 43 is, of course, regulated due to contact between the end of the skirting 31 and the annular flange 18. However, this upward movement is sufficient, to the end that the studs 34 and 35 may be released from the horizontal portions of the bayonet slots to allow said studs to be received in the vertical portions of said slots when the drill pipe is rotated to in turn rotate the body of the fishing tool. When this occurs, upward movement of the drill pipe and fishing tool body will bring the slips into engagement with the surface of the drill pipe or "fish" 48. If it becomes necessary to release the "fish" from the fishing tool, this is easily accomplished by a mere lowering of the drill pipe to in turn lower the body, the leaf springs 46 frictionally engaging the surface of the "fish" to the end that the studs will move upwardly within the vertical portions of the bayonet slots, whereupon a turning of the drill pipe will permit the studs to engage within the horizontal portions of said slots, thus releasing the slips from engagement with the "fish".

In the several figures, I have shown packing 9 which closely surrounds the "fish", as seen in Figures 1, 2, and 4 and 5. If a "fish" becomes frozen or otherwise stuck within a well hole, the well operator often attempts to circulate oil to the bottom of the bit. It is apparent that in this attempted circulation, the fluid must pass through the "fish" if the "fish" happens to be drill pipe. Thus, the packing will assure that the oil will properly circulate through the "fish" to the point desired. As the material rises around the "fish" and the fishing tool, the packing will prevent debris and other material tending to maintain the "fish" frozen from entering the fishing tool, it being remembered that the oil being circulated and received within the fishing tool is exerting a pressure against the inner surface of the packing. Thus, the interior of the fishing tool is maintained in a fairly clean condition, with assurance of operation of the various parts thereof.

It is obvious that various changes and modifications and variations may be made in practicing the invention in departure from the particular showing of the drawings without, however, departing from the true spirit of the invention as defined by the scope of the appended claims.

I claim:

1. A combination release overshot and rotary socket, including a body member formed at one end with an inner tapered wall, a slip carrier within said body, slips secured to said carrier and adapted to engage said tapered wall, an annular nut secured to one end of said slip carrier and provided with annular teeth extending within said carrier, a sub secured to said body, and resilient means within said sub and bearing against said annular nut to urge said nut and said slip carrier in one direction.

2. A combination release overshot and rotary socket, including a body member formed at one end with an inner tapered wall, a slip carrier within said body, slips secured to said carrier and adapted to engage said tapered wall, an annular nut secured to one end of said slip carrier and provided with annular teeth extending within said carrier, a sub secured to said body, resilient means within said sub and bearing against said annular nut to urge said nut and said slip carrier in one direction, and means for releasably holding said slip carrier in a given position within said body.

3. A combination release overshot and rotary socket, including a cylindrical body, the inner surface of which is tapered adjacent one end thereof, slips arranged in annular formation within said body and adapted to engage said tapered inner surface of the body to cause approach and separation of the slips when the slips move in one direction, a slip carrier, a friction nut connected to the upper portion of the slip carrier, the relationship of the parts being such that a "fish" may be received between said slips and within the said slip carrier for engagement with said friction nut, and releasable locking means between said body and the slip carrier whereby when a "fish" engages said nut, said slip carrier is prevented for rotating and the lock is released to permit the slips to engage the "fish".

4. A combination release overshot and rotary socket, including a cylindrical body, the inner surface of which is tapered adjacent one end thereof, slips arranged in annular formation within said body and adapted to engage said tapered inner surface of the body to cause approach and separation of the slips when the slips move in one direction, a slip carrier, a friction nut connected to the upper portion of the slip carrier, the relationship of the parts being such that a "fish" may be received between said slips and within the said slip carrier for engagement with said friction nut, releasable locking means between said body and the slip carrier whereby when a "fish" engages said nut, said slip carrier is prevented from rotating and the lock is released to permit the slips to engage the "fish", and means between said slips and said body causing rotation of said slips when the body is rotated.

LEE S. SORENSEN.